United States Patent [19]

Lavau

[11] 4,284,191

[45] Aug. 18, 1981

[54] ENDLESS CONVEYOR WITH LOCALLY VARYING SPEEDS

[76] Inventor: René C. Lavau, 22, rue de Verneuil, Paris, France, 75007

[21] Appl. No.: 102,307

[22] Filed: Dec. 11, 1979

[30] Foreign Application Priority Data

Dec. 13, 1978 [FR] France ................................ 78 35106

[51] Int. Cl.³ .......................... B66B 9/12; B65G 23/14
[52] U.S. Cl. .................................... 198/792; 198/334; 198/833
[58] Field of Search ........................ 198/334, 792, 833

[56] References Cited

U.S. PATENT DOCUMENTS 3,939,959  2/1976  Dunstan ................................ 198/334

FOREIGN PATENT DOCUMENTS 2200277  8/1972  Fed. Rep. of Germany .......... 198/792

Primary Examiner—Jeffrey V. Nase

[57] ABSTRACT

An expanding-contracting device associated with a running linear assembly, and applicable to moving platforms, composed of a succession of forks guided over a looped path, a section of which coincides with a section of the path followed by rods of an endless belt, each fork being adapted to grip a rod and being connected to one of the adjacent forks by means of a connection device controlling, in accordance with a pre-established program, the spacing between the two forks in relation to the position of the first fork, so that the spacing decreases progressively in a first zone of the coincidence section, and increases progressively in a second zone of the section, situated downstream of the first zone.

2 Claims, 5 Drawing Figures

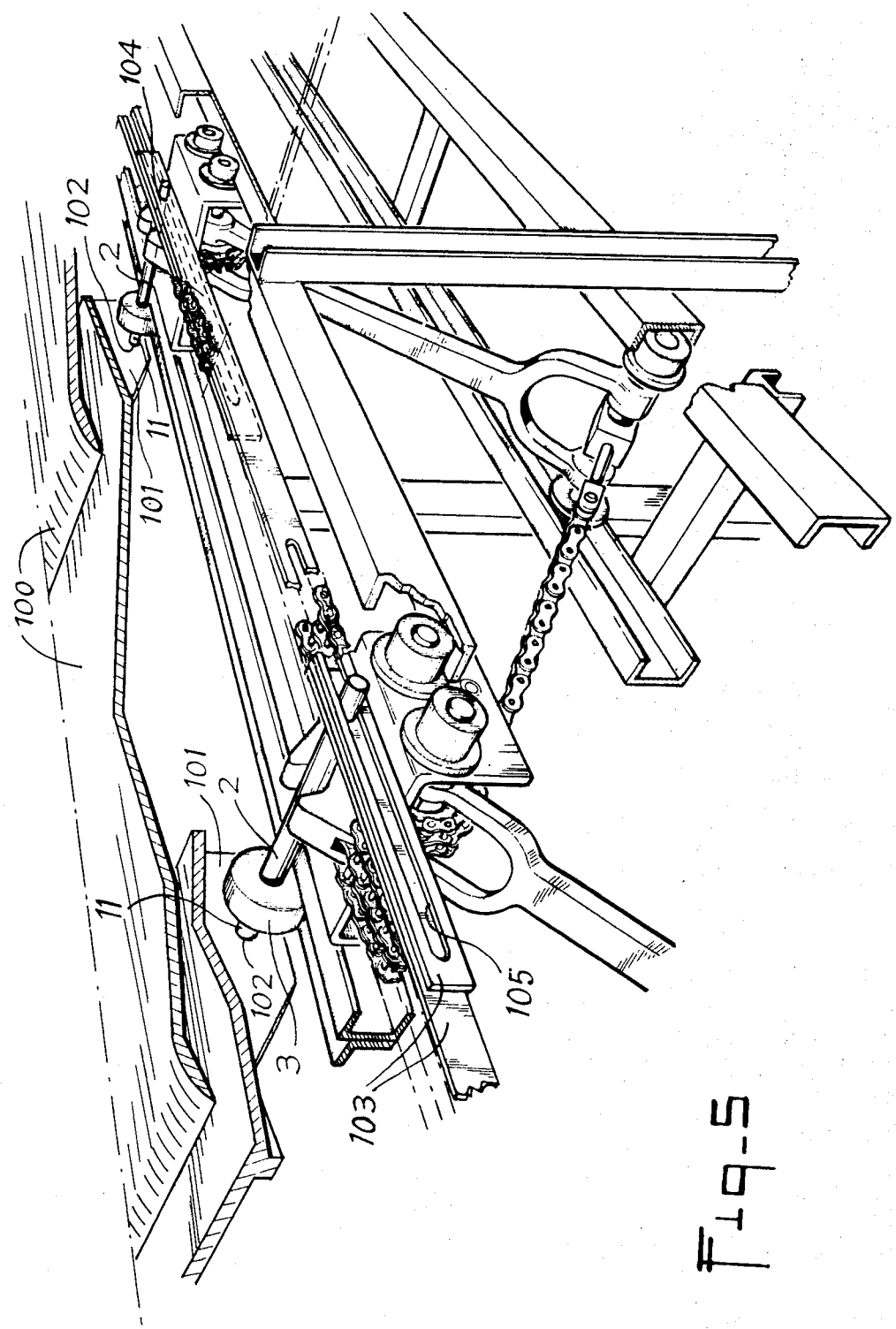

ENDLESS CONVEYOR WITH LOCALLY VARYING SPEEDS

The present invention relates to an endless conveyor with a leading side, so-called working side, intended to receive the bodies to be transported, said assembly being constituted by a succession of so-called conveying elements, of variable spacings guided along a looped path; so-called expanding-contracting means, for varying the spacing of adjacent conveying elements over at least one section of the path of the said linear assembly, so-called controlled section; and driving means for running the said linear assembly.

In the known conveyors of this type (Swiss Pat. No. 397 999 and British Pat. No. 1 273 561) the expanding-contracting means form an integral part of the endless linear assembly; said means, therefore, extend over the whole length of the said endless assembly; and the result is a complication of that assembly and an increase in its weight, making these known conveyors expensive and difficult to maintain.

It is an object of the present invention to overcome this disadvantage and to provide an endless conveyor with locally varying speeds, which is simple in design and inexpensive to produce and to maintain.

This object is achieved, according to the invention, due to the fact that the said expanding-contracting means are distinct from the said endless linear assembly, and that they comprise at least a control device in a fixed position and formed by a succession of so-called gripping elements guided over a looped path, a section of which, known as coincidence section, coincides with the said controlled section of the path followed by the elements of the said linear assembly, each gripping element being capable of gripping a conveying element at the upstream end of said coincidence section, and of releasing this conveying element at the downstream end of the coincidence section, each gripping element, so-called first element, being connected to one of the adjacent gripping elements, so-called preceding element, by a connecting device controlling, in accordance with a pre-established program, the spacing between these two gripping devices as a function of the position of the said first element along said coincidence section, so that the said spacing decreases progressively in a first zone of the coincidence section and increases progressively in a second zone of the said section, situated downstream of the first zone.

Advantageously, the endless linear assembly comprises mechanical connecting means for connecting each conveying element with an adjacent one in order to determine the maximum valve of the spacing between adjacent conveying element: said spacing being advantageously maximum outside the said controlled section.

Advantageously, the expanding-contracting means comprise two controlling devices, each one of which is associated to a respective controlled section of the endless linear assembly, each one of said controlled sections being situated close to a respective end of the working side of the endless linear assembly.

Advantageously, the said driving means comprise an end drum on which is mounted the said endless linear assembly, said drum being positively driven in rotation about its axis.

Advantageously, between the said first and second zones of said coincidence section, there is a third zone in which the spacing between the gripping devices remains constant.

Advantageously, the device connecting together two adjacent gripping elements comprises, in manner known per se, a chain which is tied by one of its ends to the first element, which passes over a loose pinion of the preceding element and which is tied by its other end to an auxiliary element guided over a pre-determined looped path, said path following substantially the path of the gripping elements, the spacing between the two paths being non-uniform over at least part of the coincidence section, a rigid connection joining, on the one hand the auxiliary element and on the other hand the said first element.

Advantageously, a moving platform is constituted by the top side of an endless belt comprising a succession of rigid transverse rods connected together by mechanical connection means allowing the spacing between two adjacent rods to vary between two limit values, and the upper side is associated to at least two control devices fixedly mounted, one at the upstream end and the other at the downstream end of the moving platform, the gripping elements of these devices being each composed of a fork, the opening of which can receive one rod of the belt.

Thus, in this conveyor, the expanding-contracting means are separate from the endless linear assembly which is meant to carry the objects—or persons—to be transported. The general structure of the conveyor is thus simplified and its maintenance is made easier.

It is to be further noted that, according to the invention, the expanding-contracting means are actually driven by the endless linear assembly itself, the latter acting, in uniform an synchronous manner, over the whole length of the coincidence section; this prevents all risks of the expanding-contracting means jamming.

The invention will be more readily understood on reading the following description given in reference to the accompanying drawings, in which:

FIG. 5 is a similar view to that shown in FIG. 4 showing another embodiment.

Figure 1:
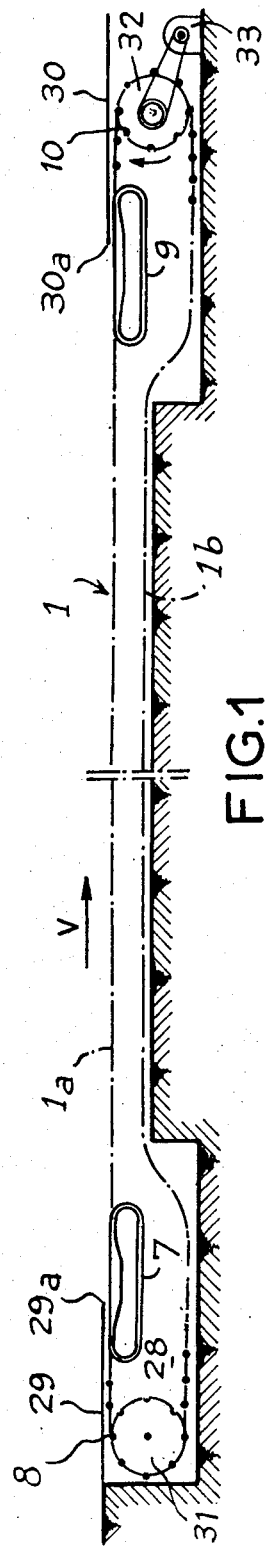
FIG. 1 is an elevational view of a longitudinal vertical cross-section of a moving platform using the expanding-contracting devices according to one embodiment of the invention.

The moving platform shown in the drawings comprises an endless belt 1 with two superimposed sides 1a and 1b, the upper side 1a constituting the moving platform proper.

Figure 2:
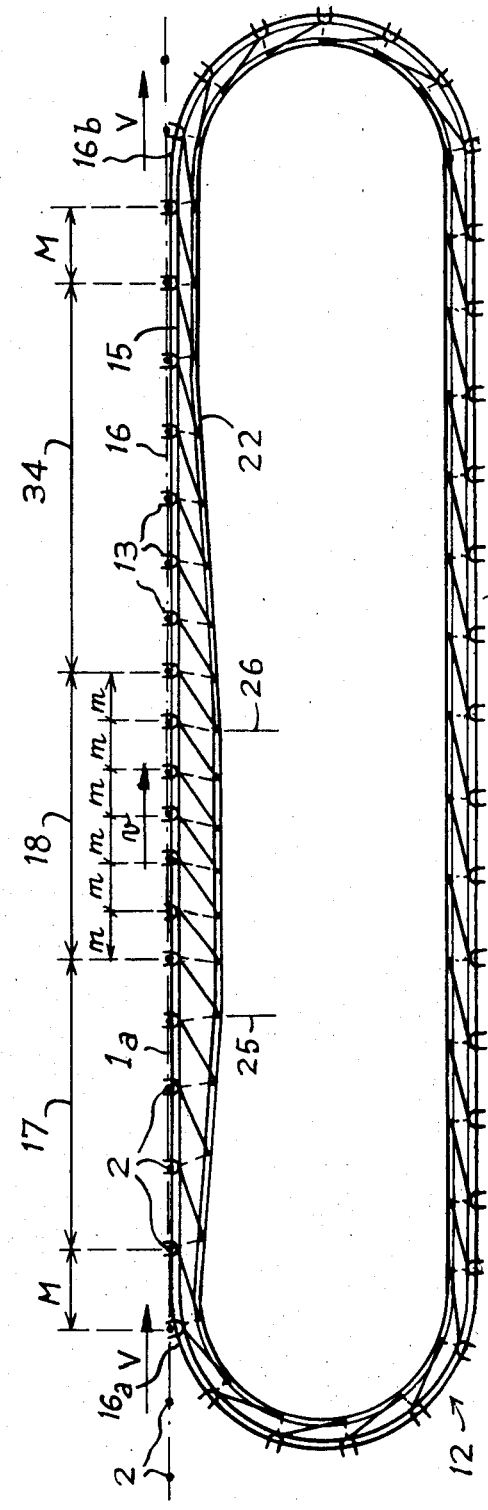
FIG. 2 is a side elevation of an expanding-contracting device used in the moving platform shown in FIG. 1.
Figure 3:
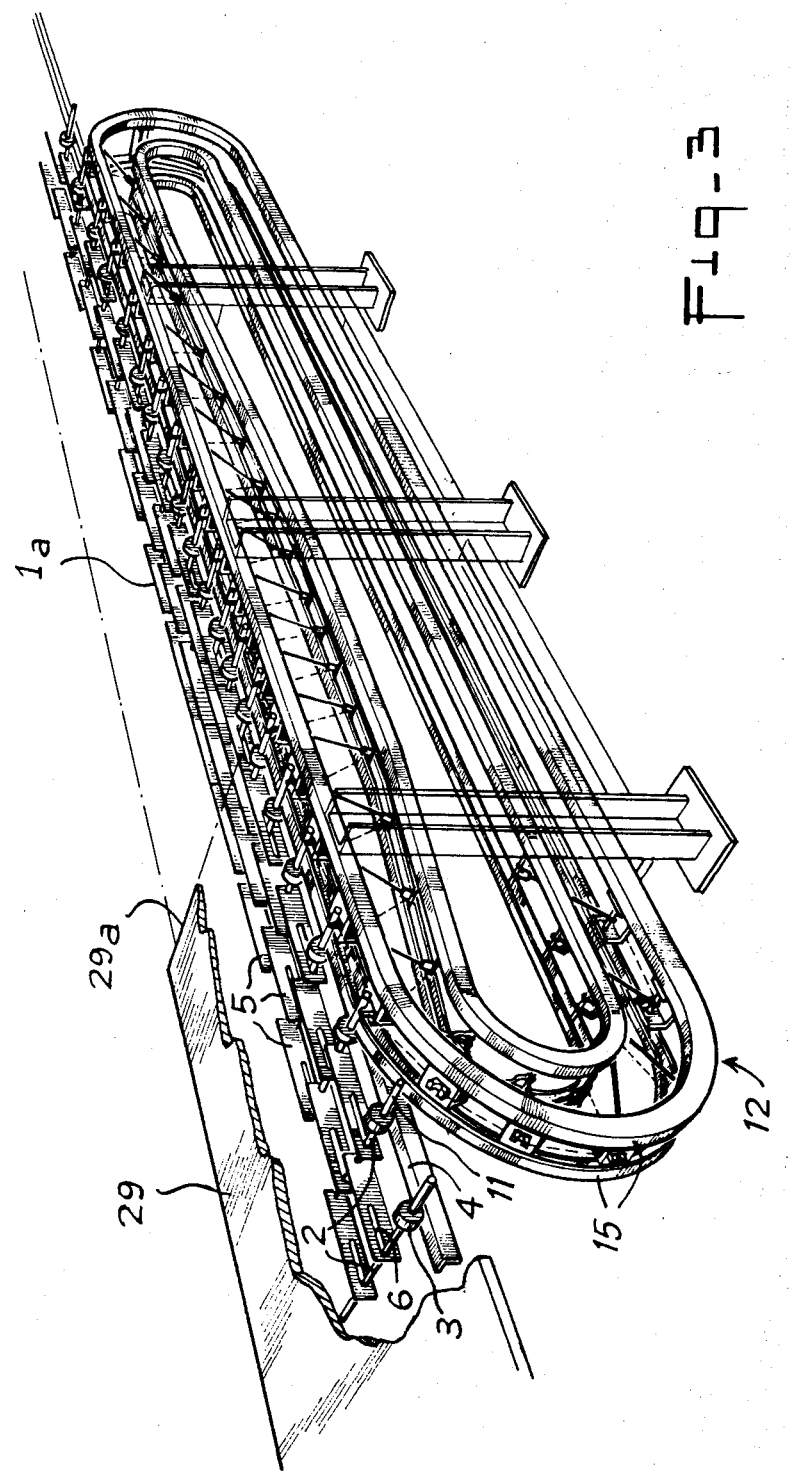
FIG. 3 is a partial perspective view of the moving platform shown in FIG. 1.

The apron of the endless belt is composed of a succession of rigid transverse axes - or rods - 2, each provided, at each end, with a runner 3 running on a respective fixed runway 4. Each axis 2 is connected to the preceding one by means of a plurality of rigid vertical blades 5 lying in the direction of the longitudinal axis of the apron. Each blade 5 is mounted for pivotment about the said axis 2 and is provided, at its end opposite that pivoting connection, with a longitudinal opening 6 which is traversed by the preceding axis 2, which axis 2 can slide along the said opening 6 without any vertical transverse clearance. Each axis 2 can thus be moved with respect to the preceding axis between a position for which the spacing between the axes is minimum "m", and a position for which the spacing between the axes is maximum "M" (FIG. 2). The value of "M" is determined by the length of the openings 6.

The upper side 1a of the endless belt 1 is associated to two so-called expanding-contracting devices, fixedly mounted, one (7) close to and downstream of the upstream end 8 of the upper side 1a, and the other (9), close to and upstream of the downstream end 10 of the upper side 1a.

Each device 7, 9 is meant to grip each transverse axis 2, in order to bring it progressively closer to the just preceding axis 2 until the spacing between the said axes reaches the minimum "m", and to move it progressively away from the said preceding one until the spacing reaches the maximum "M".

To this effect, each axis 2 extends laterally at each of its ends, in 11, beyond the fixed runway 4 and beyond the width of the belt 1, and each expanding-contracting device 7, 9 comprises two endless assemblies such as 12, placed laterally on either side of the upper side 1a of the endless belt 1. Each endless assembly 12 comprises a succession of forks 13, each capable of gripping in its opening 13a one adjacent end 11 of a transverse axis 2. Each fork 13 is provided on each side with a pair of runners 14 having flanges 14a, running on a fixed-guiding runway 15 which is looped and thus guides each fork 13 along a looped path one upper side 16 of which coincides with the path followed by the axes ends 11 which axes ends are are adjacent when the axes 2 run along the upper side 1a.

The distance between two adjacent forks 13 is, at the upstream end 16a of the upper side 16, equal to the maximum spacing "M" between two adjacent transverse axes 2 of the endless belt 1. Said distance decreases progressively in an upstream end zone 17 of the side 16 to reach the minimum spacing "m" between two adjacent axes, in a median zone 18 of the path followed by the said upper side 16. Then, the said distance progressively increases downstream of the said median zone 18 to reach at the downstream end 16b of the upper sides 16, the maximum spacing "M" between two adjacent axes 2 (FIG. 2).

To this effect, each fork 13, so-called first fork, is connected to the preceding fork 13 by a mechanical connection device, controlling the spacing between these forks, as a function of the position of the first fork on the upper side 16, according to a pre-determined program.

In the example shown, the said connection device comprises a Galle chain 19, which is tied at one end 19a to the said fork 13, passes over a pinion 20 loosely mounted on the preceding fork 13, and is tied, by its other end 19b to an auxiliary carriage 21 running by means of flanged runners 21a on a fixed runway 22 situated substantially in the same vertical plane as the runway 15 of the forks 13, and which is offset with respect to the runway 15, inwardly of the loop formed by the said runway 15. The mechanical connection device is completed by a rigid connection 23 mounted to pivot, on the one hand on the auxiliary carriage 21, and on the other hand on the said first fork 13, by rotation means orthogonal to the vertical plane determined by the runways 15 and 22.

The spacing—or distance measured vertically—between the said runways 15 and 22 is substantially constant over the whole length of the lower side 24 of the path run by the forks 13, but as can be seen on FIG. 2, said spacing varies, on the side adjacent the upper side 16, as follows:

The said spacing increases regularly from the upstream end 16a of the upper side 16, as far as a point 25 of the said side, from which point the said spacing becomes constant as far as a second point 26 from which the said spacing starts decreasing progressively until the downstream end 16b of the upper side 16.

It is understandable that an increase of the spacing between the runways 15 and 22 causes the two adjacent forks 13 concerned to come closer together, whereas a reduction of the said spacing causes the said forks to move apart.

As can be seen in FIG. 1, the endless belt 1 is housed in a cavity 28 and the upstream end 8 and downstream end 10 of the upper side 1a of the said belt are covered with a respective fixed platform 29 and 30. The free edge 29a of the oncoming platform 29 is situated at right angle with the upstream end of the zone 18 of the device 7, whereas the free end 30a of the outgoing platform 30 is situated at right angle with the downstream end of the zone 18 of the device 9.

The endless belt 1 is mounted on two end drums 31 and 32 one of which (31) is loosely mounted whilst the other (32) is positively driven in rotation by a motor 33.

The runways 15 and 22 are each constituted, in the illustrated example, by a pair of U-shaped rails with horizontal side flanges, each rail pivoting the opening of the U towards that of the other rail in the pair.

According to the example illustrated in FIG. 2, the zone 17 wherein the forks 13 are progressively brought closer together is shorter than the zone 34 wherein said forks are progressively moved apart, said zone 34 being situated immediately downstream of the zone 18.

The zone 17 being intended to be entirely covered by the oncoming platform 29 (in the case of the device 7) or by the outgoing platform 30 (in the case of the device 9) it is advantageous to reduce its length to a minimum. FIG. 2 shows a side view on an enlarged scale of the device 7 shown in FIG. 1. The detailed side view of the device 9 of FIG. 1 is deduced from FIG. 2 by symmetry, with respect to a vertical plane transverse to FIG. 2.

It will be noted that the running direction of the moving platform described hereinabove may be reversed without necessitating any modification of the devices composing it.

According to one variant, the moving platform further comprises an intermediate expanding-contracting device placed on the side 1a between the devices 7 and 9. Said device enables people to walk on and off laterally in that part of the platform situated at right angle to the zone 18 of the said intermediate device. In such a case, the zones 17 and 34 are advantageously of the same length.

The moving platform 1a also differs from the conventional apparatus by the arrangement adopted for the pivotally mounted elements forming the floor of this platform, each element being constituted by all the blades 5 mounted for pivotment about the same axis 2, and said elements being arranged so that each one can partly fit inside the next element—or overlap it—when the axes 2 move closer together.

Thus, the moving platform is driven at a speed V, greater than the normal speed v, by the driving drum 32 situated at the downstream end and driven by the motor 33, the return being ensured by the free drum 31 placed at the other end of the endless belt 1.

The axes 2 are moved closer together due to the action of two devices 7, 9 in conformity with the invention, and respectively situated in the oncoming and outgoing zone of the belt 1, in which zone the speed is thus brought back to the normal value v.

The user walks on and off in normal conditions, via the access plates 29 and 30 which extend the stationary floor as far as the zone of reduced speed v of the platform.

Between these zones, the user is transported at an increased speed V which can reach 12 km/H in the case where the floor of the platform is composed of multiple covering elements, such as element 100 of the embodiment shown in FIG. 5.

Figure 4:
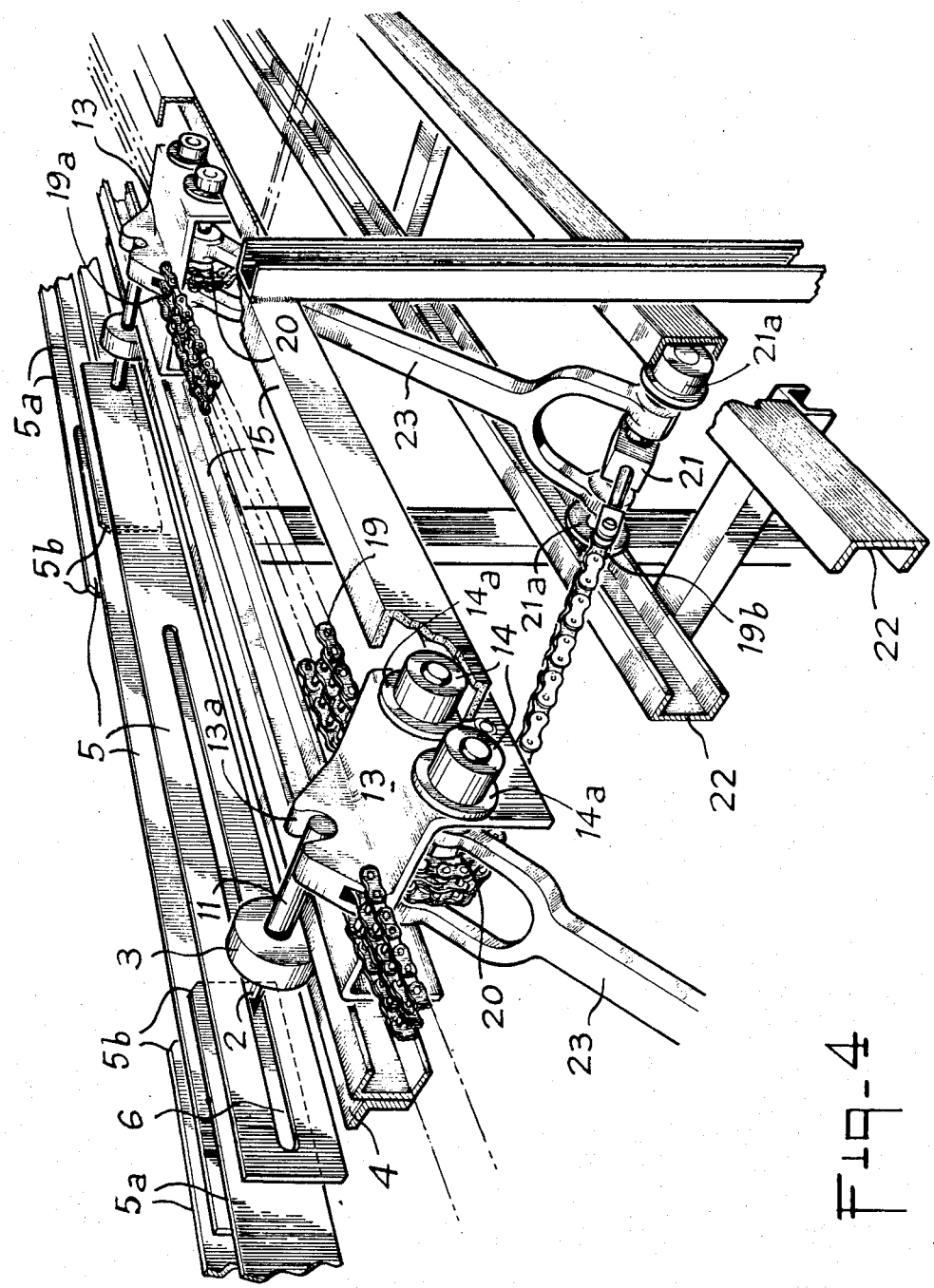
FIG. 4 is a partial view in perspective, on an enlarged scale of FIG. 3.

To allow a "combing" of the floor of the moving platform, each one of two adjacent blades 5 that are mounted on a same axis 2 of the floor extends above the other blade 5, by its upper edge 5a. Also, as can be seen in FIG. 4, the edge 5a extending above high blades 5 is bevelled or chamfered in 5b, at each end.

According to the embodiment shown in FIG. 5, the blades 5 as being elements directly supporting bodies to be transported, are replaced by floor elements overlapping one another 100. Each element 100 is journalled on one respective end of an axis 11 by means of vertical support members 101 fixedly mounted on the lower face of the said elements 100; said members 101 are each provided with a bore—or bearing—102, which is traversed by the corresponding end of the axis 11. To allow the spacing between two adjacent axes 2 to vary, between the minimum value "m" and the maximum value "M", blades 103 are used which are similar to the blades 5 described hereinabove. In the same way as the blade 5, each blade 103 is pivotally mounted on a respective axis 2, and each one is provided at its end opposite the pivoting connection 104, with a longitudinal opening 105 which is traversed by the preceding axis 2. According to a variant, the said mechanical connection via blades 103 of the axes 2 may be replaced by a chain connection.

What is claimed is:

1. An endless conveyor with locally varying speeds comprising: a linear endless assembly with a leading working side receiving the bodies to be transported, said assembly being composed of a succession of conveying elements, of variable spacings guided along a loop path; expanding-contracting means for varying the spacing of adjacent conveying elements over at least one controlled section of the path of the said linear assembly; and driving means for running the said linear assembly, wherein the said expanding-contracting means are distinct from the said endless linear assembly, and comprise at least a control device in a fixed position and formed by a succession of gripping elements guided over a loop path, of which a coincidence section coincides with the said controlled section of the path followed by the elements of the said linear assembly, each gripping element being capable of gripping a conveying element at the upstream end of said coincidence section, and of releasing this conveying element at the downstream end of said coincidence section; each gripping element, being connected to one of the adjacent preceding gripping elements, by a connecting device controlling, in accordance with a pre-established program, the spacing between these two gripping elements as a function of the position of the said first-mentioned gripping element along said coincidence section, so that the said spacing decreases progressively in a first zone of the coincidence section and increases progressively in a second zone of the said section, situated downstream of the first zone.

2. A conveyor as claimed in claim 1 wherein the connecting devices are provided to determine the maximum value of the spacing between adjacent conveying elements and wherein said spacing reaches its maximum outside the controlled section.

* * * * *